July 5, 1966     R. J. HEATHERINGTON ETAL     3,259,135
HARVESTING APPARATUS

Filed Nov 18, 1963     3 Sheets-Sheet 1

Inventors
Robert J. Heatherington
Melvin Ward
George Wright
By Stevens, Davis, Miller & Mosher
Attorneys July 5, 1966  R. J. HEATHERINGTON ETAL  3,259,135

HARVESTING APPARATUS

Filed Nov 18, 1963

Inventors
Robert J. Heatherington
Melvin Ward
George Wright
By Stevens Davis Miller & Mosher
Attorneys July 5, 1966  R. J. HEATHERINGTON ETAL  3,259,135
HARVESTING APPARATUS Filed Nov. 18, 1963  3 Sheets-Sheet 3

Inventors
Robert J. Heatherington
Melvin Ward
George Wright
By Stevens, Davis, Miller & Mosher
Attorneys

United States Patent Office 3,259,135
Patented July 5, 1966

3,259,135
HARVESTING APPARATUS
Robert James Heatherington, St. Lambert, Quebec, Melvin Ward, New London, Prince Edward Island, and George Wright, Sherwood, Prince Edward Island, Canada, assignors to Prince Edward Island Frosted Foods Limited, Sherwood, Prince Edward Island, Canada, a company of Prince Edward Island, Canada
Filed Nov. 18, 1963, Ser. No. 324,463
Claims priority, application Canada, Nov. 22, 1962, 862,877
5 Claims. (Cl. 130—30)

This invention relates to a harvesting machine particularly adapted for use with Brussels sprouts plants.

At the present time almost all Brussels sprouts are harvested manually by cutting the individual sprouts from the plant. In most cases the individual sprouts are removed by hand in the field although this method of harvesting is slow, difficult, and costly. When hand picking, it is necessary to remove the leaves from the stalk and then to stand over the plant and starting at its base near ground level to apply a downward pressure with the thumb to each sprout in turn, breaking it away from the stalk. Under these conditions one person can pick only 20 to 25 pounds of Brussels sprouts per hour; however, these methods are made necessary since most Brussels sprouts plants are of the indeterminate or progressive growth type. In this type of plant the individual sprouts sprouts mature progressively up the stalk over a period of time and this type of growth requires several pickings from the same plant as the sprouts attain proper size for harvest.

Recently a new variety of Brussels sprouts plants has been developed whose growth is more determinate in nature, and which lends itself to once-over picking as the lower sprouts retain their freshness and firmness without attaining undesirable size, while the younger upper sprouts sprouts develop to a size suitable for picking.

The development of this type of plant now enables the harvesters to cut the whole plant and to bring it to a processing plant before manually removing the individual sprouts from the stalk. However, this method of harvesting the sprouts is also slow, tiring, and expensive since one worker can only remove 30 to 40 pounds of Brussels sprouts per hour by this method. Accordingly, there is a need for a device which will enable efficient, quick and economical harvesting of Brussels sprouts.

It is an object of this invention to provide a method and apparatus which will greatly speed the harvesting of Brussels sprouts and which will reduce the associated cost and difficulty.

According to this invention a device is provided for use in removing appendages from a main stalk comprising inner cutting means including a cutting edge, outer cutting means including a cutting edge, both said cutting means being adapted for rotation about a common axis, and a guide in alignment with both said cutting means and adpated to receive material passed through both said cutting means, said cutting edges extending in a direction away from said guide and the extremity of the cutting edge of said outer cutting means extending further from said guide than the extremity of the cutting edge of said inner cutting means, and said inner cutting means being disposed at a radius less than said outer cutting means.

By way of example an embodiment of the invention will now be described with reference to the accompanying drawings in which.

Figure 1:
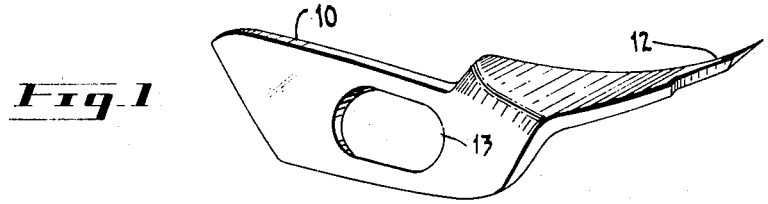
FIGURE 1 is a perspective view of an individual knife blade of the present invention.
Figure 2:
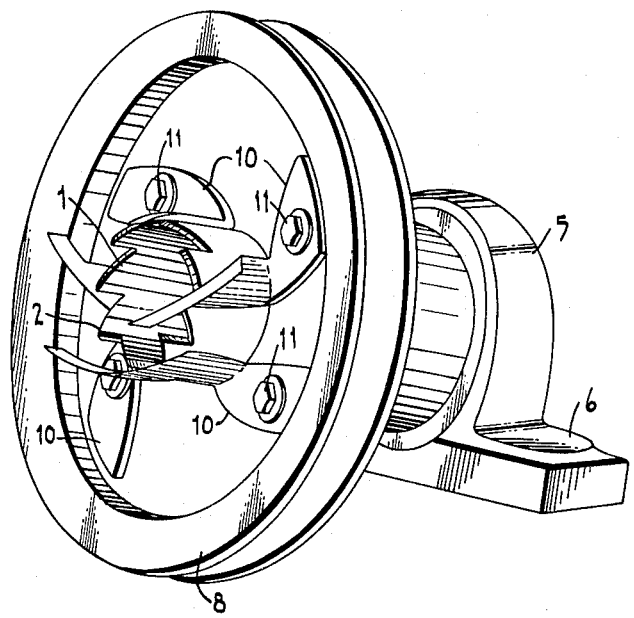
FIGURE 2 is a perspective of an assembled apparatus of the present invention.
Figure 3:
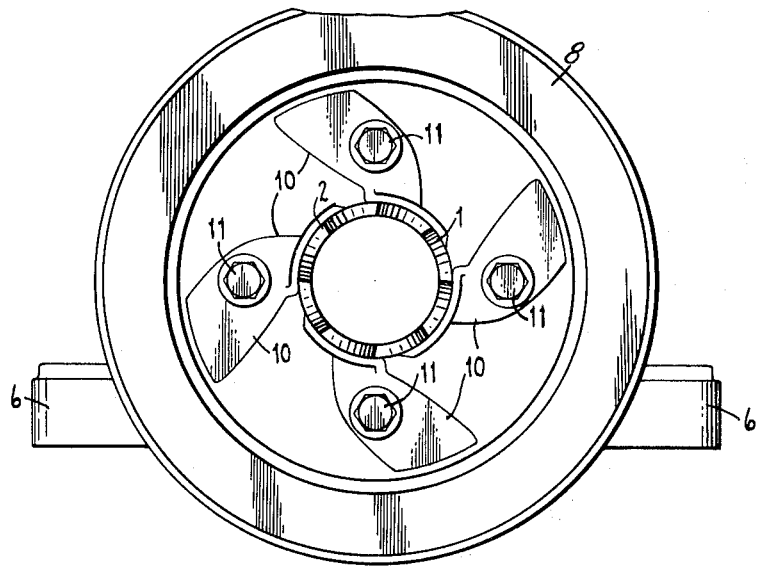
FIGURE 3 is an end view of the apparatus of FIGURE 2.
Figure 4:
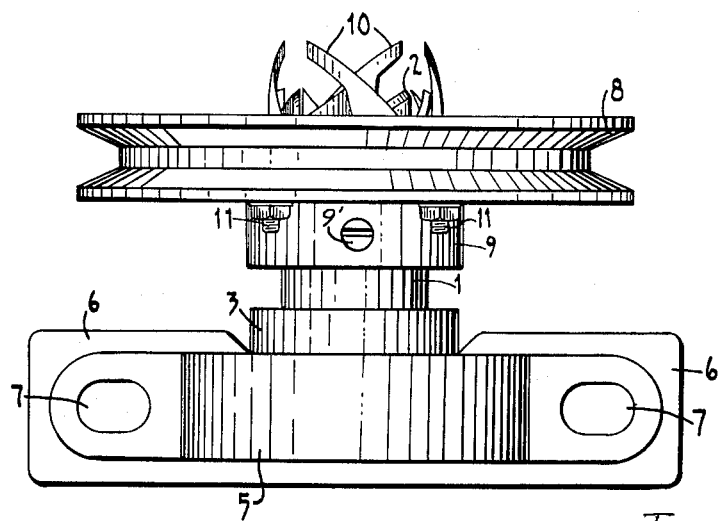
FIGURE 4 is a top view of the apparatus of FIGURE 2.
Figure 5:
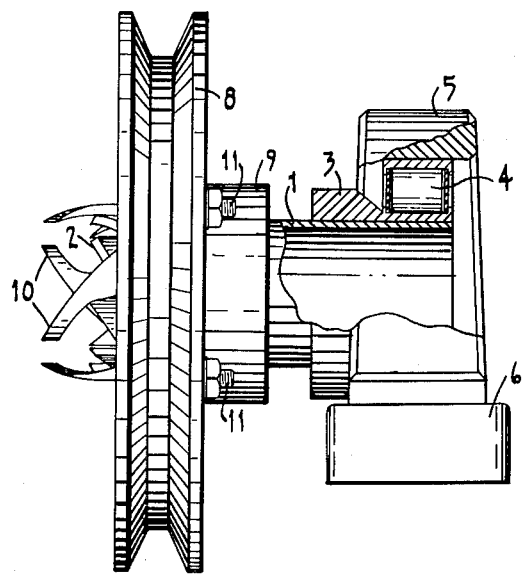
FIGURE 5 is an elevational view of the apparatus of FIGURE 2 partially cut away.
Figure 6:
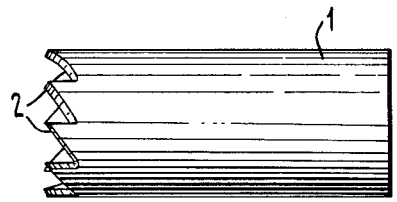
FIGURE 6 is an elevational view of a cylindrical guide for use in the apparatus of FIGURE 2.

Referring now to the drawings, a rigid cylindrical casing 1 (FIGURE 6) is sharpened at one end to form a series of jagged saw-tooth cutting edges 2 completely around its periphery. The end of casing 1, remote from the toothed end, is releasably mounted into collar 3 of a conventional roller-bearing assembly 4 (see FIGURE 5). Roller-bearing assembly 4 is mounted in a conventional self-aligning roller bearing cartridge 5. This cartridge 5 is adapted to be mounted rigidly to a plane surface by means of flanges 6 which contain mounting holes 7. A conventional V-belt pulley 8 with collar 9 is removably mounted, as with a set screw, to the casing 1 and adjacent to the toothed-end 2. Four knife blades 10 (FIGURE 1) are bolted to pulley 8 by means of bolts 11. Although in the drawings the knife blades have been shown with only a hole 13, it is possible, and in some instances preferable, to provide the knife blades with an elongated slot, so that the relationship of the cutting edges of the knife blades 10 to the teeth 2 of the cylinder may be readily adjusted.

In operation the cartridge 5 is mounted to a rigid horizontal surface by means of bolts, screws, or such-like through the mounting holes 7 in flanges 6. The V-belt pulley 8 is connected to a source of power, such as a gasoline or electric motor, by means of a conventional V-belt and may be operated at any desired speed of rotation by varying the pulley sizes. With the device rotating at its desired speed, the Brussels sprouts plant with its leaves and roots removed is inserted by hand, small end (top) first, into the centre opening of the cylindrical casing 1 defined by the cutting edges 2. The knife blades 10 with the curved cutting edge as shown at 12 sever the individual sprouts from the stalk by cutting through the stems, leaving a stump of the stem on the main stalk. As the plant is fed into the opening and the sprouts are removed from the stalk, the saw-tooth cutting edges 2 reduce the size of the stem and the cylinder guides the stalk and keeps it centered and steady. This was found desirable since the plant stalks are generally tapered and also of varying cross-section and diameter. In addition, some sprouts grow close to the stalk and, if they are cut off too short, the leaves fall off and the sprouts are of no commercial value.

A number of difficulties may be encountered in the mechanical harvesting of Brussels sprouts. As mentioned above, it is desirable to include in the centre of the rotating curved blades a cylinder which serves to guide the stalk. This inner cylinder with its saw-tooth cutting edges does cut down the stalk somewhat, but this evens out the irregularities and holds the stalk centred and steady as the plant is passed through the machine. In the embodiment illustrated the cylinder and the inner cutting edges are integral. It is possible and in some instances may be preferable to to have the guide cylinder stationary and the inner cutting edges rotating separately. In this situation the guide would not necessarily have to be cylindrical in shape and could be a polygonal tube or such-like as long as it provided the necessary steadying and guiding function as the stalk is fed through the outer and inner cutting edges. Where a cylinder is used it would be preferable to have inner radius of the cylinder substantially the same as the radius of the inner cutting edges so that it will provide the proper guiding and steadying of the stalk as it is fed through. In the situation where the inner cutting edges are separate from the guide the outer knife blades and inner cutting edges could rotate together or even be designed to rotate in opposite directions. Similarly the cylinder and inner cutting edges, if integral, could be adapted to rotate in the opposite direction to the outer knife blades.

The stalks of Brussels sprouts plants are often crooked and curved. For this reason the guide cylinder is kept reasonably short so that a curved stalk may more readily pass through it. It must not be too short, however, since it will not then provide proper support for the stalk. The desired length may be readily determined and will be apparent to those skilled in the art. It will also be apparent that in the embodiment illustrated the cylinder may be rotatably mounted on a rigid surface by means other than the flanged roller bearing cartridge described herein and that a plurality of roller bearings could be used. In addition, several Brussels sprouts harvesters may be interconnected in such a manner that they could be driven from the same power source.

Although in the example illustrated herein, the outer knife blades are mounted on the pulley which is also used to turn the device, it is possible and within the scope of this invention to mount the outer knife blades directly onto the cylinder or to impart rotary motion to the device by some other means, such as a chain and sprocket drive.

It has been found preferable to have the outer knife blades curved to the shape of the stalk to avoid cutting into the individual sprouts as they are being cut from the stalk, since the sprouts, in most cases, are compactly arranged around the stalk. It may be possible to have more blades or even just one knife blade and for them to have straight edges without departing from the scope of this invention.

Brussels sprouts grow on the stalk in a spiral manner, some plants spiralling to the right and others to the left. This also made it desirable to curve the knife blades and in addition eliminated the possibility of removing the sprouts by use of a knife moving straight up the stalk. In addition, due to the crooked and irregular shape of the Brussels sprouts plants and the flexibility of stalk, it was found desirable to keep the plant steady and rotate the knives, rather than the alternative of placing the stalk in a lathe-type machine whereby a non-rotating knife would be used to cut the sprouts off the stalk.

In the method of harvesting Brussels sprouts utilizing this invention the plants are cut off at ground level in the field (either mechanically or by hand) and brought to the harvesting area. The leaves are then removed from the stalk and the stalk fed into the rotating harvester of this invention. It has been found in practice that a single worker can remove about 400 to 500 pounds of sprouts per hour using this device and that under ideal conditions even higher output is possible. This, of course, is a vast improvement on the 30 to 40 pounds previously mentioned herein. It has been found desirable in some cases to size-grade the plants before mechanical picking. Multiple installations of the device according to this invention with cylinders and knives of different sizes may then be utilized by feeding the plants into the harvester of most suitable size.

In harvesting the Brussels sprouts by this method a considerable amount of chaff results, particularly from the chewing down of the stalk by the inner cutting edges. It has been found advantageous to place a chute or conveyor beneath the harvester which will carry the sprouts to a suitable size grader such as a screen or reel which will eliminate the chaff and small immature sprouts. The sprouts may then be passed on to a final inspection area where any damaged heads or other fragments of the stalk or leaves are removed.

It will be apparent from the above as it is apparent to workers in this field that the present invention fills a definite need for a more efficiently operating and speedy method and apparatus for the harvesting of Brussels sprouts.

We claim:

1. A device for use in removing appendages from a main stalk comprising; a cylindrical guide means having an entrance and exit end, means mounting said cylinder guide means for rotation, a cutting edge provided on the entrance end of said cylinder to define an inner cutting means, a pulley coaxially mounted on and adjacent the entrance end of said cylinder, cutting means mounted on the side of said pulley adjacent said entrance end and radially spaced from said inner cutting means for defining an outer cutting means, said outer cutting means, being designed so that upon rotation of said pulley, said outer cutting means will circumscribe a circle having a larger diameter than the circle defined by the inner cutting means.

2. A device as claimed in claim 1 wherein said guide and said inner cutting means are rigidly interconnected and adapted for rotation.

3. A device as claimed in claim 1 wherein said inner cutting means is integral with said cylindrical guide and the cutting edges are at the end of said guide proximate said outer cutting means.

4. A device as claimed in claim 1 wherein said inner and outer cutting means are radially adjustable.

5. A device as claimed in claim 1 wherein the cutting edge of said outer cutting means is curved.

References Cited by the Examiner
UNITED STATES PATENTS

| | | | |
|---|---|---|---|
| 32,649 | 6/1861 | Rhoades | 130—31 |
| 975,631 | 11/1910 | Morral | 130—9.1 |
| 1,651,591 | 12/1927 | Foster | 130—9.1 |
| 2,455,449 | 12/1948 | Thames | 130—9.2 |
| 3,175,561 | 3/1965 | Oldershaw | 130—30 |

ABRAHAM G. STONE, *Primary Examiner.*

ANTONIO F. GUIDA, *Examiner.*

J. O. BOLT, *Assistant Examiner.*